United States Patent [19]

Gorwara

[11] 4,005,418
[45] Jan. 25, 1977

[54] COOPERATIVE SIGNAL PROCESSING BEACON TRANSPONDER

[75] Inventor: Ashok K. Gorwara, San Jose, Calif.

[73] Assignee: Stanford Research Institute, Menlo Park, Calif.

[22] Filed: Mar. 28, 1975

[21] Appl. No.: 562,829

[52] U.S. Cl. .................... 343/6.8 R; 343/6.8 LC; 343/18 B

[51] Int. Cl.² .......................................... G01S 9/56

[58] Field of Search .......... 343/6.8 R, 6.8 LC, 18 B

[56] References Cited
UNITED STATES PATENTS

| | | |
|---|---|---|
| 3,142,836 | 7/1964 | Ambrose ...................... 343/6.8 R |
| 3,149,284 | 9/1964 | Kishinsky ...................... 343/6.8 R X |
| 3,171,094 | 2/1965 | Geren et al. .................. 343/6.8 R X |
| 3,341,845 | 9/1967 | Deman ........................ 343/6.8 LC X |
| 3,566,234 | 2/1971 | Thomson ...................... 343/6.8 R X |
| 3,701,150 | 10/1972 | Dame ......................... 343/6.8 R X |

*Primary Examiner*—Malcolm F. Hubler
*Attorney, Agent, or Firm*—Lindenberg, Freilich, Wasserman, Rosen & Fernandez

[57] ABSTRACT

A radar target enhancement system is provided whereby a received target signal is regenerated and retransmitted with the same frequency and pulse width as the received target sigal.

3 Claims, 3 Drawing Figures

4,005,418

COOPERATIVE SIGNAL PROCESSING BEACON TRANSPONDER

BACKGROUND OF THE INVENTION

This invention relates to radar transponder systems and more particularly to improvements therein.

With the increase in the sizes of airports as well as with the increased traffic being handled, ground control of these aircraft has become a problem. Normally, airport surface detection (ASD) radar is used to provide ground control at these airports. However, with the increased size of these airports, it has been found that weather conditions such as rain or snow cause a substantial deterioration in the signals being displayed. Also, because of the distance of the landing plane or take-off plane from the tower, small planes may either barely be seen or not seen at all. Thus, the solution appears to require enhancement of the target signal whereby the display of the targets would be considerably improved.

OBJECTS AND SUMMARY OF THE INVENTION

An object of this invention is to provide an accurate target enhancement circuit for use with a radar system.

Still another object of this invention is to provide a reliable and relatively inexpensive target enhancement circuit.

Still another object of this invention is to provide a novel and useful target enhancement circuit.

The foregoing and other objects of this invention may be achieved in an arrangement wherein a target signal received by the radar receiver is applied to signal processing circuits wherein an oscillator is caused to oscillate at a frequency equal to that of the oscillations in the signals transmitted by the radar system. When the oscillator has attained a steady state condition, in response to the received target pulse, a switch is closed for an interval equal to the interval of the original pulses transmitted by the radar system. Oscillations from the oscillator are permitted to pass through the switch to the radar transmitter over an interval, previously measured as the interval of the duration of the pulse, which is returned as a target pulse.

Thus the output of the switch is applied to the transmitter to be retransmitted.

The novel features of the invention are set forth with particularity in the appended claims. The invention will best be understood from the following description when read in conjunction with the accompanying drawings.

A BRIEF DESCRIPTION OF THE DRAWINGS

DESCRIPTION OF THE PREFERRED EMBODIMENT

Figure 1:
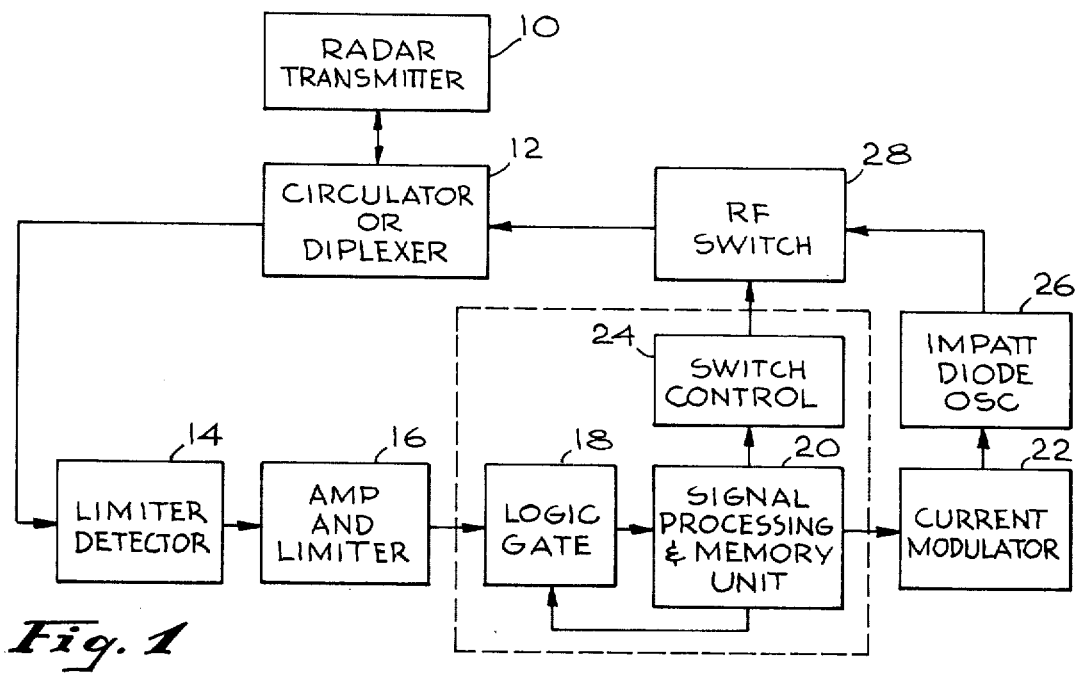
FIG. 1 is a block schematic diagram of the signal processing equipment, in accordance with this invention, which is added to a radar system for target enhancement.

Referring now to FIG. 1, there may be seen a block diagram of a target enhancement system in accordance with this invention.

A radar transmitter 10 transmits signals having a predetermined pulse width and repetition frequency. These signals are reflected from a target as target signals. The target signals are received by the antenna used for signal transmission and are applied to a circulator or diplexer circuit 12. The output of the diplexer is applied to a limiter and detector circuit 14, which serves the function of detecting and limiting the target signals. The output of the limiter and detector is applied to amplifier and limiter circuits 16 which amplifies and further limits the signals.

The system thus far described is well known and essentially comprises the signal transmitter and receiver sections of a radar transceiver.

In accordance with this invention, the output of the amplifier and limiter is applied to a logic gate 18, which is open at all times except when the following circuitry is operating in response to a received target pulse. This insures that there is no confusion in the processing of received signals.

The logic gate 18 enables circuitry, designated as signal processing and memory unit 20, which, in response to its input, initiates operation of a current modulator circuit 22 and a switch control circuit 24. The current modulator circuit 22 is a circuitry which supplies the current required for operating an Impatt diode oscillator circuit 26. The time required for the Impatt diode oscillator to attain steady state operation is stored in the signal processing and memory unit. The switch controller circuit is prevented from operating in response to its input until such time as the Impatt diode oscillator has attained a steady state operation condition. At this time, the switch controller circuit opens an RF switch 28, whereby the output from the Impatt diode oscillator circuit may be applied to the circulator or diplexer 12 to be transmitted by the transmitter 10. The signal processing memory unit 20 also has stored therein the duration of the pulses which are transmitted by the radar transmitter and as a result can terminate the signal applied to the switch controller at the proper time, whereby the width of the pulse, or the duration of the oscillations from the Impatt diode oscillator, which pass through the RF switch, are terminated, to provide a pulse width equal to the predetermined pulse width of the transmitted pulse.

The signal processing and memory unit 20 enables the logic gate 18 to open again after the Impatt diode oscillator is turned off.

Figure 2:
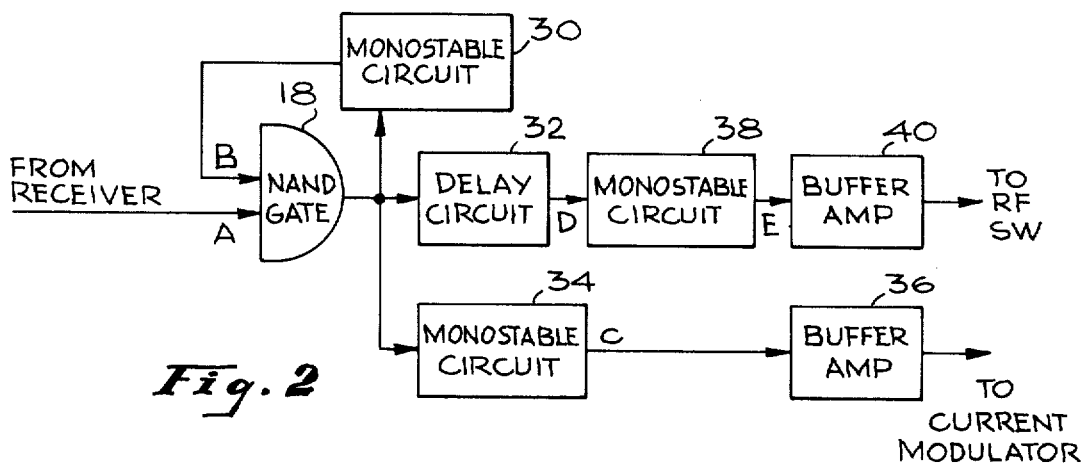
FIG. 2 is a more detailed schematic diagram of a signal processing system in accordance with this invention.
Figure 3:
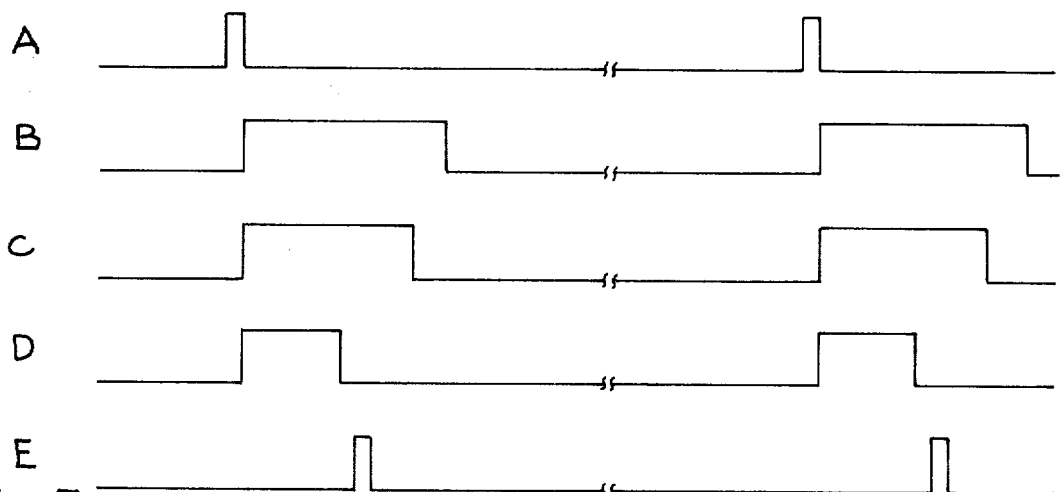
FIG. 3 is a wave form diagram which is shown to assist in an understanding of the invention.

FIG. 2 is a block schematic diagram showing further details of the signal processing system in accordance with this invention. The logic gate 18 comprises a Nand gate having one input from the receiver and a second input, which is the output of a monostable circuit 30. Referring to FIG. 3, the pulse wave train designated by the letter A represents the signals received by the Nand gate 18 from the receiver, and the pulse wave train B represents the signals received from the monostable circuit 32.

The output of the Nand gate is applied to the monostable circuit 30, to a delay circuit 32, and to a second monostable circuit 34. The monostable circuit 30 wave form is shown in FIG. 3 as a wave form B. It serves to close the Nand gate for the interval required to turn on the Impatt diode oscillator, permits it to reach steady state, and then turns off. At that time the Nand gate is enabled to receive the next target signal to be enhanced.

Monostable circuit 34 provides an output to a buffer amplifier 36 which has the wave form represented in FIG. 3 by the wave form C. This is a pulse signal which turns on the current modulator and maintains it turned on for the interval required to insure that it attains a steady state operation, and that it provides sufficient oscillations for the intervals over which the RF switch will remain open. This interval is determined as the pulse width of the signal to be transmitted from the system. The monostable circuit is maintained isolated by the buffer amplifier 36, from the current modulator. The buffer amplifier 36 applies the monostable circuit output to the current modulator.

It should be noted at this time that an Impatt diode oscillator requires a constant current DC bias source. That is what is provided by the current modulator, which is a well known source of supply for an Impatt diode oscillator. The delay circuit 32 serves the function of delaying the operation of the RF switch for the interval required for the Impatt diode oscillator to attain steady state operation. The output wave form of the delay circuit 32 is represented in FIG. 3 by wave form D. This signal is applied to a third monostable circuit 38, whose output is applied to a buffer amplifier 40. The output of the buffer amplifier is applied to the RF switch 28.

The function of the monostable circuit 38 is to provide a signal, through the buffer amplifier 40 to the RF switch, whose duration should be that of the desired pulse to be transmitted by the transmitter 10. This signal is represented by the wave form E in FIG. 3. It will be seen that the pulse width and repetition rate of the wave form E is identical to the pulse width and repetition rate of the wave form A, which is the received target signal.

It will be seen from the foregoing that the delay circuit 32 stores the time required for the oscillator to attain its steady state operating state, the monostable circuit 38, stores the pulse width of the radar system, the monostable circuit 34 stores the interval required for the oscillator circuit to attain a steady state condition and deliver the number of cycles required to fill the predetermined pulse width, and the monostable circuit 30 insures that only one pulse at a time is operated on by the signal processing system.

The target enhancement circuits provide an all digital processing technique as contrasted to the prior art analog processing techniques. The circuitry is low cost, reliable, and temperature-insensitive. By reason of the mode of operation selected, the circuitry is turned on only when target signal enhancement is required. Thus the power drain is minimized. The basic components selected for the system are all known and commercially available.

There has therefore been described here and above a novel and useful target enhancement system which can be used with existing radar systems.

What is claimed is:

1. In a radar system of the type having a transmitter for transmitting a train of pulse signals and a receiver for receiving said train of pulse signals reflected from a target, a target signal enhancement circuit comprising
inoperative oscillator means for generating, when operative, a train of pulse signals having the same frequency and duration as is transmitted by said transmitter, said inoperative oscillator means requiring a first interval for reaching its steady state condition after being rendered operative,
inoperative switch means for applying the output of said oscillator means to said transmitter for transmission when operative,
first means responsive to said receiver receiving said train of pulse signals reflected from a target for generating a first pulse having a width equal to said first interval plus a second interval equal to the time required for generating said train of pulse signals,
second means responsive to said receiver receiving said train of pulse signals reflected from a target for generating a second pulse which is delayed for said first interval and which has a width equal to said second interval,
means for respectively applying said first pulse and said second pulse to said respective inoperative oscillator means and said inoperative switch means whereby said signals reflected from said target are enhanced, and
means for preventing said first and second means responsive to said receiver receiving said train of pulse signals, from responding to another received train of pulse signals while operating in response to an already received train of pulse signals.

2. In a radar system of the type wherein a transmitter transmits a signal pulse train and a receiver receives target signals reflected from targets, means for target signal enhancement comprising Nand gate means having a first and second input and an output,
means for applying target signals to one input to said Nand gate means,
a first monostable circuit means having an input connected to the output of said Nand gate means and an output connected to the second input of said Nand gate means, said first monostable circuit means providing an output in response to its input for maintaining said Nand gate means closed for a predetermined interval,
a second monostable circuit means responsive to the output of said Nand gate means for providing an output signal having a second predetermined duration,
an operative oscillator means to which the output of said second monostable circuit means is applied for rendering said inoperative oscillator means, operative in response thereto,
delay circuit means responsive to the output of said Nand gate means for delaying said output for an interval required for said oscillator means to attain a steady state operation,
an inoperative switch means for applying, when operative, the output of said oscillator means to said transmitter to be transmitted,
a third monostable circuit means responsive to the output from said delay circuit, for rendering said inoperative switch means operative for a third predetermined interval, whereby the said target signal is enhanced and said enhanced signal has the duration and repetition frequency of said target signal.

3. In a radar system as recited in claim 2 wherein said second predetermined interval is the interval required for said oscillator to reach steady state oscillation condition and to provide oscillations over the interval during which said inoperative switch means is rendered operative,
said third predetermined interval is the interval desired for the width of the pulse signal to be transmitted by said radar system radar transmitter, and said first predetermined interval is the interval during which said oscillator means is rendered operative.

* * * * *